July 14, 1925.
J. M. PUCKETT
STORAGE BATTERY
Filed Aug. 26, 1920
1,545,695
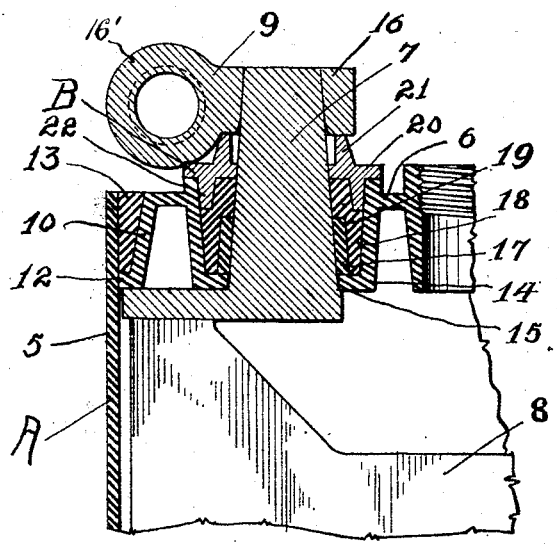
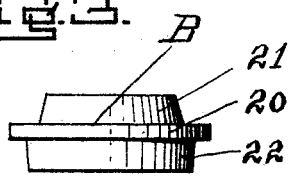
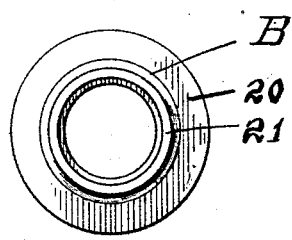
J. M. Puckett.
Inventor
By Lancaster Allwine
Attorneys Patented July 14, 1925.

1,545,695

UNITED STATES PATENT OFFICE.

JOHN M. PUCKETT, OF ELGIN, TEXAS.

STORAGE BATTERY.

Application filed August 26, 1920. Serial No. 406,161.

*To all whom it may concern:*

Be it known that I, JOHN M. PUCKETT, a citizen of the United States, residing at Elgin, in the county of Bastrop and State of Texas, have invented certain new and useful Improvements in Storage Batteries, of which the following is a specification.

This invention relates to storage batteries, and the primary object of the invention is to provide an improved means for connecting the pillar post to the battery jar cover, so as to prevent the jarring loose of the pillar post and the consequent seeping of the electrolyte or acid from the battery.

Another object of the invention is to provide an improved washer for storage batteries, which is so designed as to support the pillar post and cell connectors or terminals to and forms a fluid tight joint therewith and with the jar cover, whereby the loosening of the pillar post and loss of the battery fluid is eliminated.

A further object of the invention is to provide an improved washer which can be readily associated with the pillar post terminals and which can be constructed so as to conform to the configuration of any type of battery jar cover or pillar post.

A still further object of this invention is to provide an improved washer for storage batteries of the above character which is durable and efficient in use, one that is simple and easy to manufacture, and one which can be placed upon the market and embodied with a storage battery at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary vertical section through a battery jar and cover illustrating the use of the improved washer.

Figure 2 is a top plan view of the improved washer.

Figure 3 is a detail side elevation of the improved washer.

Referring to the drawings in detail, wherein similar reference characters designate corresponding parts throughout the views, the letter A indicates a storage battery and B the improved washer for use in connection therewith.

The storage battery A may be of the usual or any preferred construction or make and as shown includes the usual battery jar 5, the jar cover 6, the pillar post 7 which is connected in the ordinary manner to the usual grids 8 and the battery cells connector or terminal 9.

The jar cover 6 is provided at its perimeter with a downwardly extending and outwardly inclined flange 10, and the lower edge of this flange is provided with a substantially right angular extension 12 which engages the inner surface of the battery jar. The flange 10 and the extension 12 forms means for receiving the battery sealing compound 13 which may be of the usual or ordinary variety. As in the usual construction the cover 6 is provided with the depending sleeve 14 through which the pillar post 7 extends. The pillar post 7 has been shown circular in cross section and gradually tapered toward its upper end, but it is to be understood that the post 7 can be of any desired configuration and the washer B is formed to conform to the cross sectional configuration thereof. However, the best results have been found with the use of the tapered pillar posts. The lower end of the sleeve 14 is provided with an inwardly extending right angular flange 15 which is adapted to engage the outer face of the base of the pillar post 7. The sleeve 14 as shown also projects slightly from the top of the cover plate 6.

The battery terminal or cell connector 9 is also of the usual construction and as shown includes the annular body 16, which may be welded or secured in any other preferred manner to the upper end of the pillar post 7, and the offset portion 16' to which the lead to or from the battery may be connected.

If so desired, a tapered sleeve 17 may be associated with the annular right angular extension 15 so as to form a well 18 for the sealing compound 19 which may be of the usual type. If so desired the tapered sleeve 17 may be formed integral with the right angular extension 15. The improved washer B which forms the subject matter of the present invention may be formed of any material, preferably soft metal, such as lead and includes an annular body 20 which is formed substantially flat and is adapted to engage the upper edge of the extended portion of the sleeve 14.

The inner edge of the annular body 20 is adapted to tightly fit the outer surface of the pillar post 7 so as to form a fluid tight joint therewith. The upper surface of the body 20 has formed integral therewith the upstanding flange 21, which is spaced a slight distance from the inner edge of the body 20. This flange 21 is adapted to engage the lower surface of the battery terminal or cell connector 9 so as to form a support for the same and to form a tight joint therewith. The lower surface of the body 20 is provided with a depending flange 22 which is arranged in spaced relation to the outer edge of the body 20 and this flange is adapted to tightly engage the sleeve 14, so as to form a fluid tight joint therewith.

In use of the improved washer, the pillar post 7 is inserted in the sleeve 14 in the usual manner and the battery sealing compound is poured around the same, after which the washer B is inserted over the pillar post and pressed tightly down into firm engagement with the sleeve 14. Owing to the shape of the sleeve 14 and the flange 22, the inner surface of the annular body 20 will be forced into tight engagement with the pillar post 7. It will be further noted that the compound 19 will be forced downwardly and inwardly towards the sleeve 17 and post 7 and placed under compression so as to provide a fluid tight seal and prevent the leakage of electrolyte or other acid from the jar. The battery terminals or cell connector 9 is then placed in position on the upper edge of the pillar post 7 in engagement with the upstanding flange 21 and the same is welded or otherwise secured into position as is common in the ordinary construction.

From the foregoing description, it can be seen that an improved simple attachment has been provided for storage batteries, which will effectively hold the pillar posts in position against jarring and absolutely prevent the leakage of the battery fluid from the cell.

Changes in details may be made without departing from the spirit or scope of this invention; but,

I claim:

1. In a storage battery, the combination with a jar cover having a terminal post opening therein, a sleeve arranged in said opening and extending above and below the same, a right angular extension formed on the lower edge of the sleeve, a collar arranged on said extension in spaced relation to the sleeve, a terminal post extended through said opening and engaging said collar, a sealing compound arranged around said post and said sleeve and collar, and a terminal lug fitted on the upper end of said post, of a washer formed of soft metal including an annular body having its inner edge in frictional fluid tight engagement with the post, and its lower surface in engagement with the upper edge of the sleeve, a depending annular flange formed on the lower surface of the body in frictional engagement with the inner wall of the sleeve, and an upwardly extending annular flange formed on the upper surface of the body arranged in spaced relation to the post for engagement with the terminal lug.

2. In a storage battery construction the combination of a jar cover having a pocket, a terminal post extending upwardly through the pocket, a filler of sealing compound in the pocket about said post, and a terminal hub fitting about the post and forced downwardly into closing engagement with the upper end of the pocket and engaging the sealing compound to place the compound under pressure and force the same into close engagement with the post and walls of the pocket.

3. In a storage battery construction, a jar cover having a pocket, a terminal post extending upwardly through the pocket, sealing compound in the pocket about the post, and means for closing the upper end of the pocket about the post and applying pressure to the compound to compress the compound tightly in the pocket about the post and prevent leakage.

4. In a storage battery construction, a jar cover having a pocket, a terminal post extending upwardly through the pocket, sealing compound in the pocket about the post, a disk fitting about the post and forced downwardly into engagement with the upper end of the pocket, an annular rib extending from the disk into the pocket in contacting engagement with the walls of the pocket and in spaced relation to the post and adapted to move the compound towards the post when the disk is forced downwardly to place the compound under compression, and means for retaining the disk in a depressed pressure exerting position.

5. In a storage battery construction, a jar cover having a pocket, a terminal post extending upwardly through the pocket, and sealing compound in the pocket about the post and compressed to provide tight engagement with the post and walls of the pocket and prevent leakage.

JOHN M. PUCKETT.